United States Patent
Baker et al.

(10) Patent No.: US 8,527,656 B2
(45) Date of Patent: Sep. 3, 2013

(54) REGISTERING AN ENDPOINT WITH A SLIDING WINDOW OF CONTROLLERS IN A LIST OF CONTROLLERS OF A SURVIVABLE NETWORK

(75) Inventors: Al Baker, Brick, NJ (US); Eric Cooper, Kanata (CA)

(73) Assignee: Avaya Inc., Basking Ridge, NJ (US)

( * ) Notice: Subject to any disclaimer, the term of this patent is extended or adjusted under 35 U.S.C. 154(b) by 499 days.

(21) Appl. No.: 12/211,284

(22) Filed: Sep. 16, 2008

(65) Prior Publication Data

US 2010/0070563 A1  Mar. 18, 2010

Related U.S. Application Data

(63) Continuation-in-part of application No. 12/056,246, filed on Mar. 26, 2008, and a continuation-in-part of application No. 12/056,248, filed on Mar. 26, 2008, and a continuation-in-part of application No. 12/056,250, filed on Mar. 26, 2008, and a continuation-in-part of application No. 12/056,253, filed on Mar. 26, 2008.

(51) Int. Cl.
*G06F 15/16* (2006.01)
(52) U.S. Cl.
USPC ........................................................ 709/239
(58) Field of Classification Search
USPC ........................................................ 709/203
See application file for complete search history.

(56) References Cited

U.S. PATENT DOCUMENTS

| | | | |
|---|---|---|---|
| 6,145,089 | A | 11/2000 | Le et al. |
| 6,490,610 | B1 | 12/2002 | Rizvi et al. |
| 6,779,016 | B1 * | 8/2004 | Aziz et al. .................... 709/201 |
| 6,992,974 | B1 | 1/2006 | Tripathi |
| 7,298,708 | B2 | 11/2007 | Nasiri et al. |
| 7,333,505 | B2 | 2/2008 | Yoakum et al. |
| 7,570,756 | B2 | 8/2009 | Park et al. |

(Continued)

FOREIGN PATENT DOCUMENTS

| | | |
|---|---|---|
| JP | S63-285053 | 11/1988 |
| JP | 2003-198603 | 7/2003 |

(Continued)

OTHER PUBLICATIONS

Baker, et al., "Simultaneous Active Registration in a SIP Survivable Network Configuration", U.S. Appl. No. 12/056,246, filed Mar. 26, 2008, 43 pp.

(Continued)

*Primary Examiner* — Sulaiman Nooristany
(74) *Attorney, Agent, or Firm* — Sheridan Ross P.C.

(57) ABSTRACT

Provided are methods, devices, and systems for maintaining a SIP survivable network. A SIP endpoint maintains an ordered list of the controllers that are available to it and registers with a subset containing the first N controllers in the list, where N is a plurality, but not all, of the controllers in the list, and obtains services from one or more of the controllers of the subset. If one of the controllers of the subset becomes unavailable, the endpoint registers with the $(N+1)^{st}$ controller in the list, thereby adding it to the subset. If and when the one controller becomes available again, the endpoint de-registers with the $(N+1)^{st}$ controller, thereby removing it from the subset, and if necessary re-registers with one controller. The subset thus forms a sliding window on the list.

16 Claims, 7 Drawing Sheets

(56) References Cited

U.S. PATENT DOCUMENTS

| | | | |
|---|---|---|---|
| 7,836,185 B2 | 11/2010 | Ben-Ezra et al. | |
| 2003/0167343 A1* | 9/2003 | Furuno | 709/244 |
| 2003/0174648 A1 | 9/2003 | Wang et al. | |
| 2003/0177411 A1* | 9/2003 | Dinker et al. | 714/13 |
| 2004/0125757 A1 | 7/2004 | Mela et al. | |
| 2005/0060411 A1 | 3/2005 | Coulombe et al. | |
| 2006/0035656 A1 | 2/2006 | Sung et al. | |
| 2006/0047836 A1 | 3/2006 | Rao et al. | |
| 2006/0072523 A1 | 4/2006 | Richardson et al. | |
| 2006/0146792 A1 | 7/2006 | Ramachandran et al. | |
| 2006/0182255 A1 | 8/2006 | Luck et al. | |
| 2006/0227728 A1 | 10/2006 | Baumann | |
| 2006/0235981 A1 | 10/2006 | Westman et al. | |
| 2007/0008955 A1 | 1/2007 | Delaney et al. | |
| 2007/0041327 A1 | 2/2007 | Foster et al. | |
| 2007/0047571 A1 | 3/2007 | Kandikonda et al. | |
| 2007/0140112 A1 | 6/2007 | Osterhout et al. | |
| 2007/0143449 A1* | 6/2007 | Wray West et al. | 709/219 |
| 2007/0160058 A1 | 7/2007 | Zhou et al. | |
| 2007/0178899 A1 | 8/2007 | Kuhn | |
| 2007/0201678 A1 | 8/2007 | Marquette et al. | |
| 2007/0248220 A1 | 10/2007 | Crandell et al. | |
| 2007/0253328 A1 | 11/2007 | Harper et al. | |
| 2007/0266162 A1 | 11/2007 | Dutta et al. | |
| 2008/0031226 A1 | 2/2008 | Eng et al. | |
| 2008/0052344 A1 | 2/2008 | Alecci et al. | |
| 2008/0101335 A1 | 5/2008 | Badger | |
| 2008/0137531 A1 | 6/2008 | Tal-Aviv et al. | |
| 2008/0144605 A1* | 6/2008 | Qiu et al. | 370/352 |
| 2008/0183991 A1 | 7/2008 | Cosmadopoulos et al. | |
| 2009/0150562 A1 | 6/2009 | Kim et al. | |
| 2009/0193071 A1 | 7/2009 | Qiu et al. | |

FOREIGN PATENT DOCUMENTS

| | | |
|---|---|---|
| JP | 2007-004361 | 1/2007 |
| JP | 2007-200103 | 8/2007 |
| WO | WO 2005/101760 | 10/2005 |
| WO | WO 2006/038950 | 4/2006 |
| WO | WO 2009/046455 | 4/2009 |

OTHER PUBLICATIONS

Baker, et al., "Survivable Gateway Behavior Using SIP Signaling in a SIP Network Configuration", U.S. Appl. No. 12/056,248, filed Mar. 26, 2008, 43 pp.

Baker, et al., "Survivable Phone Behavior Using SIP Signaling in a SIP Network Configuration", U.S. Appl. No. 12/056,250, filed Mar. 26, 2008, 42 pp.

Baker, et al., "Failover/Failback Trigger Using SIP Messages in a SIP Survivable Configuration", U.S. Appl. No. 12/056,253, filed Mar. 26, 2008, 42 pp.

Avaya Inc., "Installing and Administering SIP Enablement Services R3.1", doc. No. 03-600768, Issue 1.5, Feb. 2006, Chapter 2, pp. 27-48.

Avaya Inc., "SIP Personal Information Manager Release 3.0 (SIP Enablement Services R3.0)", doc. No. 03-300441, Issue 1.2, Jul. 2005, Chapter 1, pp. 19-24.

Avaya Inc., "Application Notes for Configuring the Quintum Tenor AS VoIP MultiPath Switch as a Back-To-Back User Agent in Support of SIP Endpoints and Local Survivability Avaya Communication Manager and Avaya SIP Enablement Services", Solution & Interoperability Test Lab, Application Notes, Aug. 24, 2006, 59 pp.

Cisco, "Cisco SRST Description", http://www.cisco.com/application/pdf/en/us/guest/products/ps5049/c2001/ccmigration_09186a00801d1e94.pdf, 2 pp.

Cisco, "Preparing Cisco SRST Support for SIP", http://www.cisco.com/univercd/cc/td/doc/product/software/ios123/123newft/123t/123t_11/srst32ad/srs_sip.htm, 1 p.

Audio Codes, "AudioCodes CPI & Access Gateway Products—Mediant 1000 VoIP Media Gateway", http://www.audiocodes.com/Objects/LTRT-00308_DS_Mediant%20201000.pdf, 2pp.

James Kempf Sun Microsystems Jonathan Rosenberg Dynamicsoft: "Finding a SIP Server With SLP; draft-kempf-sip-findsrv-00.txt" IETF Standard-Working-Draft, Internet Engineering Task Force, IETF, CH, Feb. 8, 2000, XP015030838 ISSN: 0000-0004.

Li Li et al: "Support of multimedia SIP applications in mobile ad hoc networks: service discovery and networking architecture" Global Telecommunications Conference, 2005. GLOBECOM '05. IEEE St. Loius, MO, USA Nov. 28-Dec. 2, 2005, Piscataway, NJ, USA,IEEE, vol. 6, Nov. 28, 2005, pp. 3682-3686, XP010881772 ISBN: 978-0-7803-9414-8.

Official Action for U.S. Appl. No. 12/056,248, mailed Oct. 14, 2009.
Official Action for U.S. Appl. No. 12/056,253, mailed Nov. 13, 2009.
Search Report Under Section 17 for UK Patent Appliction No. GB0910567.7, dated Sep. 24, 2009.
European search report and opinion for European Patent Application No. 08017881.7, mailed Sep. 21, 2009.
Background of the Invention for the above-captioned application (previously provided).
Official Action for U.S. Appl. No. 12/056,248, mailed Apr. 15, 2010.
Official Action for U.S. Appl. No. 12/056,250, mailed Mar. 19, 2010.
Official Action for U.S. Appl. No. 12/056,253, mailed May 28, 2010.
Official Action for United Kingdom Patent Application No. GB0910567.7, dated Feb. 28, 2012 2 pages.
Official Action for U.S. Appl. No. 12/056,250, mailed Sep. 22, 2010.
Official Action for U.S. Appl. No. 12/056,248, mailed Sep. 14, 2010.
Official Action for U.S. Appl. No. 12/056,253, mailed Nov. 26, 2010.
Official Action for U.S. Appl. No. 12/056,250, mailed Jan. 28, 2011.
Official Action for U.S. Appl. No. 12/056,248, mailed Jan. 14, 2011.
Notice of Allowance for U.S. Appl. No. 12/056,253 mailed Mar. 17, 2011.
Official Action for U.S. Appl. No. 12/056,246, mailed Mar. 4, 2011.
"Web," Nikkei Information Strategy, 2004, pp. 3-5 (cited in official action for Japan Patent Application No. 2009-188159, mailed Oct. 18, 2012).
Official Action with English translation for Japan Patent Application No. 2009-188159, mailed Oct. 18, 2012 5 pages.
Singh et al. "Failover and Load Sharing in SIP Telephony," In International Symposium on Performance Evaluation of Computer and Telecommunication Systems (SPECTS), 2004, 7 pages.
Official Action with English Translation for Japan Patent Application No. 2009-188159, mailed Feb. 12, 2013 7 pages.

* cited by examiner

REGISTERING AN ENDPOINT WITH A SLIDING WINDOW OF CONTROLLERS IN A LIST OF CONTROLLERS OF A SURVIVABLE NETWORK

CROSS-REFERENCE TO RELATED APPLICATIONS

This continuation-in-part application claims the benefit of the filing date of the following applications:

Baker et al., "Simultaneous Action registration in a SIP Survivable Network Configuration," U.S. application Ser. No. 12/056,246 filed Mar. 26, 2008;

Baker et al., "Survivable Gateway Behavior Using SIP Signaling in a SIP

Network Configuration," U.S. application Ser. No. 12/056, 248 filed Mar. 26, 2008;

Baker et al., "Survivable Phone Behavior Using SIP Signaling in a SIP

Network Configuration," U.S. application Ser. No. 12/056, 250 filed Mar. 26, 2008; and Baker et al., "Failover/Failback Trigger Using SIP Messages in a SIP Survivable Configuration," U.S. application Ser. No. 12/056,253 filed Mar. 26, 2008;

all of which are assigned to the same assignee as the present application.

TECHNICAL FIELD

This invention relates generally to communication networks and more specifically to survivable networks.

BACKGROUND OF THE INVENTION

In a client/server system architecture, a client entity receives services from a server entity. For example, a telephone receives call-connection and feature services from a telephony switch. For reliability purposes, the server may be replicated, so that if one copy of the server fails, another copy can take over and continue to provide the services to the impacted clients. This is commonly referred to as redundancy and fail-over, respectively.

Modern communications systems generally require failover to a redundant server to be effected by the client, as opposed to the server performing the failover for the client. A client must communicatively connect to and register itself with the server in order to receive services from that server. That means that in order to fail-over form a failed server to a redundant server, the client will have to have been registered with both, either alternatively or simultaneously.

In alternate registration, a client is provided with a list of servers that it may use, and it registers with only one of those servers at a time and obtains services therefrom. If and when that server fails, then the client registers with another server and obtains services from this other server. If and when the second server fails, then the client registers with a third server and obtains services from the third server. And so on. Because registration takes some time, alternate registration results in a delay in the client obtaining a service each time that the client fails over to another server.

In simultaneous registration, a client is provided with a list of servers that it may use, and it registers with all of those servers at once. The client obtains its service from one of these servers at any one time, and if that server fails, the client is poised to immediately start receiving service from one of the other servers. This requires the client to create ad maintain connections to all of the servers all at once. This is a waste of communications network resources, because only one of those connections is used at any one time.

One environment in which these issues arise is a Session Initiation Protocol (SIP) survivable network. Session Initiation Protocol (SIP) is an open signaling protocol for establishing many kinds of real-time communication sessions. Examples of the types of communication sessions that may be established using SIP include voice, video, games, applications, and/or instant messaging. These communication sessions may be carried out on any type of communication device such as a personal computer, laptop computer, Personal Digital Assistant (PDA), cellular phone, IM client, IP phone, traditional telephone, server applications, aggregates of applications, desktop applications, and so on.

A feature of SIP is its ability to use an Address of Record (AOR) as a single unifying public address for all communications to end-users, applications, and service provider networks. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Many SIP application servers exist for the purposes of enabling communications applications in a SIP environment and for serving as outbound proxies for a UA, thereby allowing complex networks to be built while hiding that complexity through proxies that devices use to connect into the network. One of the principle areas for such communications applications is call control of a SIP UA. Solutions to the problem of providing a survivable SIP network configuration include the use of SIP proxies that are employed when there is no response to SIP signaling. The proxy can be used to route the signaling via one or more alternate routes in the network. The use of a separate proxy can become expensive since an additional network element other than the call controller or a gateway is required to provide survivability.

Other network server products provide geo-redundant configurations, such that the gateway is unlikely to encounter a network server failure due to the high availability of the network server. Like the use of proxies, this particular solution is relatively expensive since high availability servers need to be purchased and distributed throughout a network. Additional shortcomings of known current solutions include the fact that the network element (e.g., gateway) is not allowed to use an alternate path if the primary SIP signaling path is unavailable; such solutions require hot standby configurations with replication of data across servers; and they require primary and secondary call controllers to use exactly the same version of SIP and provide exactly the same set of SIP features to SIP endpoints.

The logic to determine when a network failure has occurred has been traditionally placed in routers, which have the ability to check the IP layer of the network to determine if various network elements are operating properly. This failure/failback detection logic has been placed in the router to relieve the processing burden on the rest of the network components. One major shortcoming to this particular configuration is that the routers are unable to detect at the SIP application level whether a server or other network element is operational. There may be many instances when a server is operational at the IP layer level but the SIP controller is not operational. Routers and other network elements of the prior art heretofore have been unable in these situations to identify such failure conditions and would register such a server as operational. Consequently, it has been proposed to place the failure-determining logic in the Session Initiation Protocol (SIP) enabled communication endpoint and to enable the SIP endpoint to effect either alternate registration or simultaneous registration with the SIP controllers.

SUMMARY OF THE INVENTION

According to an aspect of the invention, a client (a SIP UA, for example) simultaneously registers with a subset of servers (SIP controllers, for example) that are available to it, to obtain services from at least one of the servers of the subset. The subset includes a plurality, but not all, of the available servers. If and when one of the servers in the subset fails, the client additionally registers with one of the servers remaining outside of the subset, thus bringing that one server into the subset. This technique thus strikes a middle ground between alternate registration and simultaneous registration. Illustratively, the size of the subset may be the same for all clients. Alternatively, the size of the subset may vary among clients depending on factors such as their location and who their users are.

According to another aspect of the invention, the available servers are ordered in a sequence, preferably in an order of priority in which they should be used by the client to obtain services. Initially, the subset contains the first N servers of the sequence. If one of the servers in the subset fails, the client registers with the N+1 st server in the sequence, which is the server immediately after the subset in the sequence, thus bringing this new server into the subset. This is repeated for every failure of a server in the subset. Preferably, whenever one of the failed servers in the subset returns to service, the client de-registers with the last server in the subset and if necessary re-registers with the restored server. The subset thus forms a sliding window on the sequence of available servers.

"Monitoring", as used herein, includes any type of function related to observing, recording, or detecting with instruments that have no effect upon the operation or condition of the element or group of elements that are being monitored.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refer to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. The computer-readable medium can be a serialized set of instructions encoded in a network transmission over an IP network (e.g., SOAP). Such a medium may take many forms, including but not limited to, non-volatile media, volatile media, and transmission media. Non-volatile media includes, for example, NVRAM, or magnetic or optical disks. Volatile media includes dynamic memory (e.g., RAM), such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique. More specifically, such terms may include interpreted rules like BPEL or a rules language where logic is not hard coded but represented in a rules file that can be read in, interpreted, compiled, and executed.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Moreover, the term "database" as used herein may include not only relational database systems, but any computer storage mechanism, available in both hardware and software, in RAM or on a hard disk. Those skilled in the art will recognize that the disclosed techniques may be used in any communication application in which it is desirable to maintain a SIP survivable network.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized. Examples of such well-known structures include, without limitation, IP infrastructure, Layer 2 switches, Layer IP routers, IP level firewalls, Network Address Translation (NAT) devices, SIP Session Border Controllers (SBCs), etc.

For purposes of explanation, numerous details are set forth in order to provide a thorough understanding of the present invention. It should be appreciated, however, that the present invention may be practiced in a variety of ways beyond the specific details set forth herein.

Figure 1:
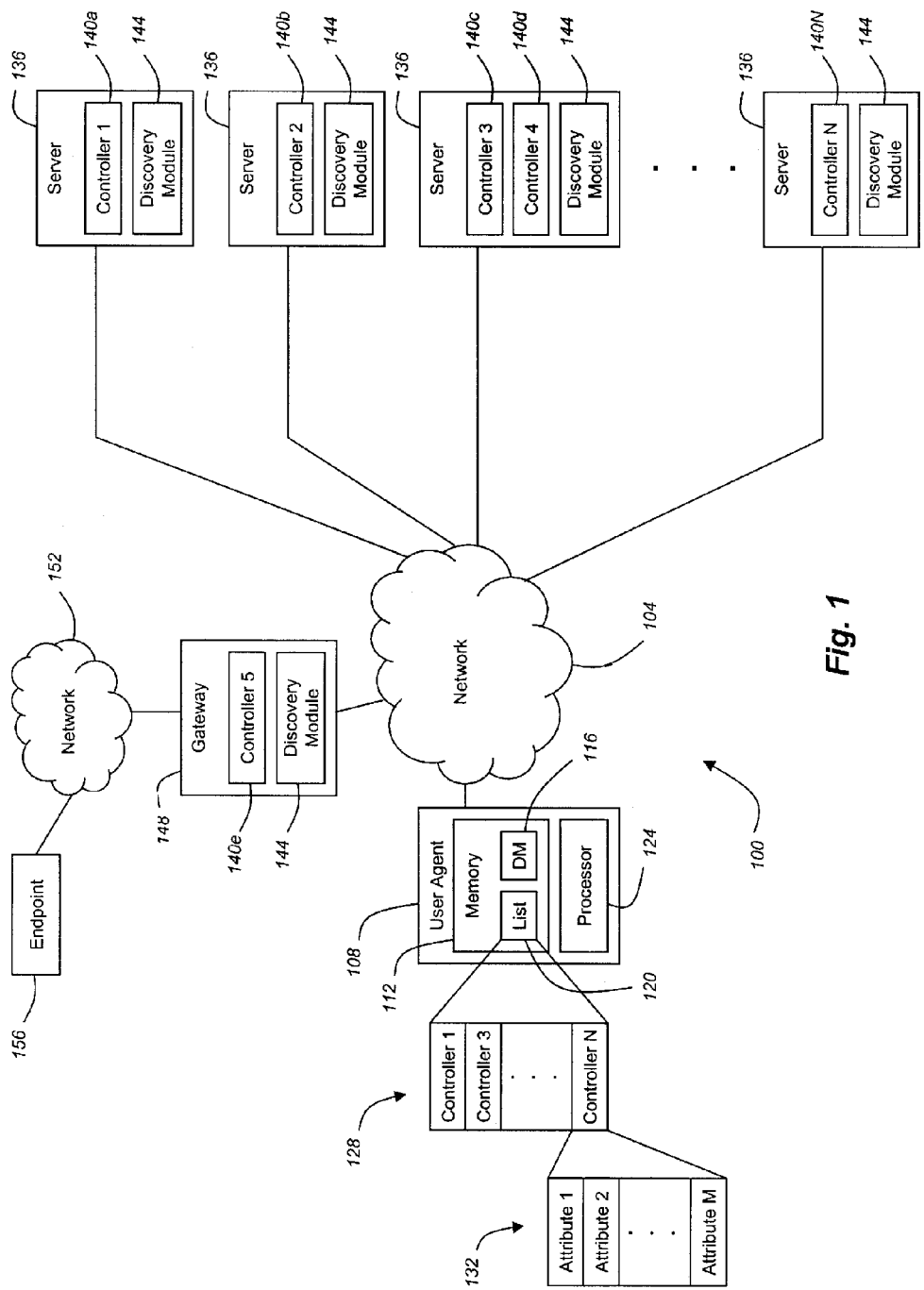
FIG. 1 is a block diagram depicting a communication system in accordance with at least some embodiments of the present invention.

Referring initially to FIG. 1, there is shown an exemplary communication system 100 architecture. The communication system 100 comprises a first network 104 connecting an endpoint, such as a SIP User Agent (UA) 108 to a number of other communication devices. The UA 108 may be adapted to communicate with other endpoints connected to the first network 104 as well as with other endpoints external to the first network 104. For example, the UA 108 may be adapted to communicate with an external endpoint 156 connected to a second network 152.

The first 104 and second 152 networks may correspond to any type of known communications network or collection of communications equipment. The first network 104 may comprise a Local Area Network (LAN), a Wide Area Network (WAN), or any other type of layer 3 and layer 4 network as defined by the OSI model.

The second network 152 may comprise any type of information transportation medium and may use any type of protocols to transport messages between endpoints. The Internet is an example of the communication network 104 that constitutes an IP network consisting of many computers and other communication devices located all over the world, which are connected through many telephone systems and other means. Other examples of the second network 152 include, without limitation, a standard Plain Old Telephone System (POTS), an Integrated Services Digital Network (ISDN), the Public Switched Telephone Network (PSTN), a LAN, a WAN, a cellular communications network, and any other type of packet-switched or circuit-switched network known in the art. Both communication networks 104, 152 may include wired and/or wireless communication technologies.

SIP functions of the client UA 108 may be provided by one or more servers 136, which are also connected to the first network 104. The client UA 108 may also be controlled by other servers or communication devices external to the first network 104. For example, a gateway 148 connecting the first network 104 with the second network 152 may also be adapted to provide SIP control capabilities for the UA 108.

In addition to providing SIP functions, the server 136 may also include voice call software (e.g., VoIP software), video call software, IM software, voice messaging software (e.g., multi-media messaging such as audio and video messaging, IM messaging, etc.), recording software, an IP voice server, a fax server, a web server, an email server, call center application(s), and the like.

In accordance with embodiments of the present invention, the server 136 can include interfaces for various other protocols such as a Lightweight Directory Access Protocol (LDAP), H.248, H.323, Simple Mail Transfer Protocol (SMTP), Internet Message Access Protocol 4 (IMAP4), Integrated Services Digital Network (ISDN), E1/T1, HTTP, SOAP, XCAP, STUN, and analog line or trunk.

The server 136 may also include a PBX, an Automatic Call Distributor (ACD), an enterprise switch, or other type of communications system switch (e.g., any device capable of routing calls from one telephone to another, such as a complex machine (or series of them) in a central exchange that works by connecting two or more circuits together, each circuit being connected to a subscriber telephone, according to a dialed telephone number) or server, as well as other types of processor-based communication control devices such as media servers, computers, adjuncts, etc.

The gateway 148 is provided to act as a translation unit between disparate telecommunications networks such as PSTN; Next Generation Networks; 2G, 2.5G and 3G radio access networks; or PBX. One of the functions of the gateway 148 is to convert between the different transmission and coding techniques for the various networks. Media streaming functions such as echo cancellation, DTMF, and tone sender may also be supported by the gateway 148. The gateway 148 may further convert signals/messages from one network operational paradigm (e.g., transmission protocol) to another.

To provide SIP functionalities to the client UA 108, the servers 136 and/or gateway 148 may comprise one or more controllers 140*a*-N. The UA 108 may be adapted to register with one or more of the controllers 140*a*-N at a time. As used herein, the term "register" and "registration" refer to the SIP registration and network attachment method and process, which includes but is not limited to the sending and acknowledgement of the SIP REGISTER message, and may include other mechanisms such as the SUSBSCRIBE message for subscriptions, querying using OPTIONS message, as well as other non-SIP mechanism such as firewall and NAT detections using the STUN protocol, HTTP queries, etc.

The controllers 140*a*-N may correspond to applications or firmware residing on the server 136 and the controllers 140*a*-N may be used to handle SIP messages directed to and received from the controlled UA 108. The SIP messages handled by the controllers 140*a*-N may correspond to outbound SIP messages originated by the UA 108 and directed toward another endpoint 156 or inbound SIP messages originated by another endpoint 156 and directed toward the UA 108. The controllers 140*a*-N may operate at the application layer of the communication system 100.

In accordance with at least one embodiment of the present invention, the UA 108 is capable of simultaneously registering with two or more, but not all, controllers 140. Each of the controllers 140 with which the UA 108 is simultaneously registered may comprise different attributes and therefore may be capable of providing the UA 108 with different SIP functions. For instance, the UA 108 may be simultaneously registered with a first controller 140*a* that uses extended extensions (i.e., advanced feature sets) and a second controller 140*b* that uses standard Internet Engineering Task Force (IETF) compliant SIP extensions for call processing according to one or more IETF RFCs on the SIP protocol, including but not limited to RFC 3261.

In a simultaneous registration configuration, the UA 108 may be capable of either an active-active registration or an active-standby registration. In an active-active registration, the UA 108 may accept SIP messages from any controller 140 with which it is registered and send SIP messages to any controller 140 with which it is registered without determining whether the message is being sent to or coming from a primary controller 140. In an active-standby registration configuration, however, the UA 108 may only use the active controllers 140 for SIP signaling purposes unless one or more of the active controllers 140 become inoperable. In such a configuration, if messages are received from a standby controller 140 and the UA 108 believes that a corresponding primary controller 140 is operational, then the UA 108 may send the SIP message back to the standby controller 140 for a re-route via the primary controller 140.

In accordance with further embodiments of the present invention, the UA 108 may execute a priority registration with the controllers 140*a*-N, whereby the UA 108 is registered with a first controller 140*a* unless the UA 108 determines that the first controller 140*a* is out of service or otherwise unavailable to provide SIP functions, in which case the UA 108 may register with a second controller 140*b*.

In accordance with still further embodiments of the present invention, a Peer-to-Peer SIP network configuration may be employed, in which case the UA 108 may register with a controller 140 on another endpoint or plurality of endpoints.

The UA 108 may comprise a memory 112 and a processor 124 for executing routines stored in memory 112 as well as processing incoming/outgoing SIP messages and media. The memory 112 illustratively includes a discovery module 116 and a list of controllers 120. The discovery module 116 is employed to discover the devices in the system 100 that comprise controllers 140 capable of controlling the UA 108. In accordance with at least some embodiments of the present invention, the discovery module 116 may be adapted to send out a discovery request to which any available controllers 140 can respond. Based on the response(s) (or lack thereof) received from the controllers 140, the discovery module 116 populates the list 120 with a number of controllers 140. The discovery module 116 may then be able to create an ordered list 128 that comprises a priority listing of the controllers 140 based on their respective attributes 132. The UA 108 may then determine which controller(s) 140 to register with based on the order of controllers 140 in the ordered list 128.

In addition to providing the ability to discover and arbitrate between controllers 140, the discovery module 116 may be further adapted to monitor the state of the communication system 100 to determine if there are any current network 104 failures, server 136 failures, gateway 148 failures, or any other type of failure which may affect the relationship between the UA 108 and its controller(s) 140. As will be discussed in further detail herein, the discovery module 116 may be adapted to proactively and reactively monitor the state of the system 100 and its components. While proactively monitoring the state of the system 100, the discovery module 116 may employ non-dialog SIP messages along with a predetermined logic to determine the state of the system 100. The UA 108 may additionally be prompted by another system 100 component (e.g., the gateway 148) to begin reactively monitoring the state of the system 100. Providing the UA 108 with the ability to monitor the state of the system 100 off-loads the processing burden from other components, such as a router. This allows each UA 108 to monitor the state of the system 100 independently, which provides more views of the system 100 and allows each UA 108 to maintain its personal records for its controllers 140. In other words, by using a combination of the intelligence from the UA 108 and other components in the system 100 (e.g., the gateway 148 and/or servers 136), a more accurate and up to date picture of the state of the system 100 can be obtained. Allowing the UA 108 to inspect the operability of the networking layer (e.g., by sending IP packets across the system 100), the SIP application layer (e.g., by sending SIP messages across the system 100), and the aggregate of the two can further increase the accuracy of the picture of the health of the system.

The servers 136 and gateway 148 may also comprise a discovery module 144 for assessing the state of the system 100. More specifically, each discovery module 144 may be used to independently monitor the state of various peer components (e.g., system 100 components that are adjacent to the device comprising the discovery module 144) as well as far end components (e.g., system 100 components that are not adjacent to the device comprising the discovery module 144). Each discovery module 144 may be utilized to independently assess the state of the system 100 and the components therein.

The discovery modules 144 may comprise a software module that is capable of being accessed by user agents 108 or other endpoints 156 in a clustered way (i.e., multiple servers 136 may be able to answer a question from an endpoint asking, "which controller do I use") or as a singleton. The discovery modules 144 can be implemented using a multitude of protocols and can further support multiple protocols at once. More specifically, each discovery module 144 may be adapted to support one or more of SOAP/HTTP, SXAP (another XML over HTTP standard like SOAP) and even SIP (e.g., by providing the list of controllers 140 in the body of a SIP message).

The discovery module 144 may be adapted to determine its own list of controllers for a given user agent 108 (which it can ultimately provide to a user agent 108 upon request) via rules processing. The rules processing may be hard coded (e.g., Java code) or may comprise a rules engine that takes a script, such as XML, parses it, and executes it when it wants to determine which is the most appropriate controller 140 for the user agent 108 requesting a list of controllers. The types of rules that may be included in the algorithm include, but are not limited to:

(1) A network locality inspection that analyzes the raw network topology (e.g., by analyzing IP packets transmitted through the network) to determine the most appropriate controller 140 for the user agent 108. Such a rule set may include a bandwidth management function, where the discovery module 144 inspects the IP of the requesting user agent 108, then does a lookup to a bandwidth store that lists the best available bandwidth and then selects the best match controller 140 for the user agent 108. In this case, the best match would likely correspond to the server 136 comprising a controller 140 that is closest in proximity to the user agent 108 and has an available bandwidth;

(2) A security inspection algorithm, since there may be certain cases where a user agent 108 should connect to a specific server 136/controller 140 for security purposes. For example, the CEO's phone may want to only connect to the highest secured servers that are constantly monitored and patched within seconds. On the other hand, the tech support phone may be allowed to connect to any one of a set of servers 136 that form a server farm, where security patches are handled within 24 hours;

(3) A user assignment algorithm where the discovery module 144 may inspect a mapping of which server(s) 136 can provide service for a particular user. If there are multiple servers, such as in a geo-redundancy configuration, multiple controllers 140 can be returned in the response;

(4) A business rules algorithm where the discovery module 144 may have customer provided hooks in the script that says all sales people use one server 136 and all tech-support people use another server;

(5) A device modality algorithm that can be initiated when the requesting user agent 108 expresses its mode (e.g., voice, Instant Messaging (IM), video, etc.) when looking for a controller 140. When employing this algorithm, the discovery module 144 may lookup an internal capabilities assignment to choose the best controller 140 that provides the most types of modes for a user. For example, a user agent 108 that can do voice and IM would prefer a server 136 that is capable of supporting both of these functions rather than just a voice server; and (6) A protocol compatibility algorithm that can be initiated when the requesting user agent 108 identifies that it supports a specific protocol set. This is particularly useful in SIP, since SIP is a multitude of protocol extensions. When the requesting user agent 108 asks for a controller 140, it can express the protocol features it supports (e.g., presence subscriptions or subscriptions in general) and the server can find the best match for that type of user agent 108.

Figure 2:
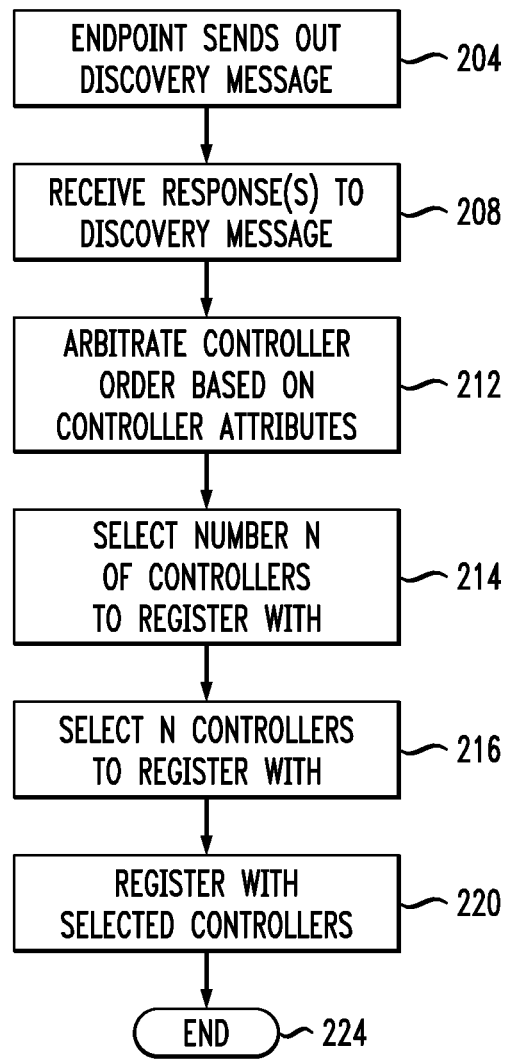
FIG. 2 is a flow diagram depicting an illustrative SIP controller discovery and registration method.

Referring now to FIG. 2, a SIP controller 140 discovery and registration method will be described in accordance with at least some embodiments of the present invention. The method may be executed by an endpoint, such as a UA 108 in the communication system 100. Each UA 108 in the communication system may be adapted to discover and register with different controllers 140. The method is initiated when the endpoint sends out a discovery message (step 204). The discovery message, in accordance with at least one embodiment of the present invention, comprises any known type of discovery message including SIP messages (e.g., OPTIONS message, NOTIFY message, or SUBSCRIBE message) that can be transmitted to one or more other components in the system 100 to test/query the SIP functionality of the component.

When the discovery message is received by the other components in the system 100 (e.g., the servers 136 and/or gateway 148) comprising a controller 140, the component responds to the discovery message with a response message. Alternatively, if no component is currently available to respond to the discovery message then no response messages are sent back to the initiating endpoint. The response messages of the controller(s) 140 are then received at the initiating endpoint (step 208). As the endpoint receives the responses, or the lack of responses, to directed discovery messages, the endpoint will employ its discovery module 116 to populate the list of controllers 120.

The response messages may also include the attributes 132 of each responding controller 140. Examples of attribute information contained in the response message include, without limitation, the corresponding server's 136 or gateway's 148 processing capabilities, the SIP extensions (i.e., SIP functions) provided by the controller 140, the number of UA's currently registered with the controller 140, the proximity of the controller 140 to the endpoint (i.e., number of hops between the endpoint and the corresponding device), and so on. The discovery module 116 of the endpoint may utilize the attribute information to arbitrate the order of the controllers 140 in the list 120 to form an ordered list 128 (step 212). The discovery module 116 may employ any type of known arbitration algorithm to determine the order of the controllers 140. For instance, the discovery module 116 may attempt to optimize all of the attributes listed for all controllers 140. Alternatively, the discovery module 116 may place the controller 140 with a selected attribute being best suited to the endpoint's needs highest in the ordered list 128.

After the discovery module 116 of the endpoint has generated the ordered list of controllers 128, the discovery module 116 determines a number N of controllers 140 with which the endpoint will register (step 214), i.e., it selects the size of the "window" into ordered list 128. In accordance with an aspect of the invention, the number N is administratively predetermined. In accordance with another aspect of the invention, the number N is determined according to a set of rules employed by the discovery module 116 that take into consideration criteria such as the attributes 132 of the controllers 140 in the ordered list 128. The discover module 116 then selects the N controllers that it will register with (step 216). The number N is an integer greater than one but less than the total number of controllers 140 in the list 128. The controllers 140 may be selected based on their respective order in the ordered list of controllers 128. In accordance with at least one embodiment of the present invention, the discovery module 116 may select a controller 140 from a server 136 and a controller 140 from the gateway 148 to simultaneously register with. In an active-standby configuration, the endpoint may select the controller 140 of one server 136 as a primary controller and the controllers 140 of other servers 136 and/or of the gateway 148 as secondary or backup controllers.

Following selection of the controllers 140, the endpoint is enabled to register with the selected controllers 140 (step 220). In accordance with at least some embodiments of the present invention, the endpoint may be adapted to register with controllers 140 having different capabilities and SIP features. For example, the endpoint may be allowed to simultaneously register with a first controller 140 using extended SIP extensions and a second controller 140 using standard SIP extensions. The extended SIP extensions may be used by the first controller 140 to provide additional features not achievable through the second controller 140.

A SIP REGISTER, SUBSCRIBE, or OPTIONS message, or other SIP signaling may be transmitted to detect if the primary controller 140 is still online and available to facilitate SIP messaging. For example, a SIP REGISTER message may be sent by the endpoint to the selected controllers 140 to initiate the registration process. In addition to providing the endpoint with the ability to register with its controllers 140, the SIP REGISTER message may also be used as a heartbeat for the controllers 140. The frequency of transmission of the SIP REGISTER message may be user configurable based on system demands. In other words, the endpoint may send refresh registrations to any controller 140 with which it is registered.

In both the active-standby and active-active configurations, the endpoint registers concurrently with all of its selected controllers 140. During its operation, the endpoint may attempt to maintain concurrent active registrations with the controllers 140 (e.g., through the periodic transmission of subsequent SIP REGISTER messages). In an active-active configuration, the endpoint may be allowed to send/receive SIP messages to/from any of the controllers 140 with which it is registered. In such a configuration, the endpoint will be simultaneously registered with two or more controllers 140. This dual registration will allow inbound SIP requests (e.g., SIP INVITE messages) from any one of the controllers 140 with which the endpoint is registered (e.g., either the first controller 140a, the second controller 140b, the third controller 140c, etc.). If the endpoint is configured with a policy to use an active-active controller model, then the endpoint may consider that incoming call from a previously failed controller 140 as if it had come from a controller 140 in service. When this occurs, the endpoint may re-try the algorithm to detect if the failed server has gone back into service. The endpoint will be configured to allow receipt of such SIP messages from any controller 140. In accordance with at least some embodiments of the present invention, the endpoint will treat the registrations as independent registrations, maintaining each with the registration logic discussed herein. More specifically, the endpoint will be allowed to register the same AOR with each controller, although the endpoint implementation can be flexible to accommodate different AORs. This is also true for the active-standby configuration.

In an active-standby configuration, on the other hand, the endpoint may only be allowed to route outbound calls and receive inbound calls from its primary controller 140. While operational, this primary controller 140 may also be referred to as the active call controller 140. The other controllers 140 with which the endpoint is registered may be referred to as the inactive or standby controllers.

In the active-standby configuration, if the endpoint receives an inbound call from a secondary or standby controller 140 while the endpoint is in its primary mode (i.e., the endpoint believes the primary controller 140 is active), then the endpoint will:

(1) Respond to the secondary controller 140 with a 100 Trying message;
(2) Send a REGISTRATION refresh to the primary controller 140 to see if the primary controller is still online and available to facilitate SIP messaging;
(3) If the primary controller 140 is still online, then the endpoint will send a 305 redirect response (i.e., Use Proxy) to the secondary controller 140. The 305 redirect response will reject the call via the secondary call controller and request that the secondary controller 140 reroute the signaling via the primary controller 140; and
(4) If the primary controller is no longer online, then the endpoint will provide standard call processing for the received call. As part of this process, the endpoint will failover to the secondary controller 140 from the primary controller 140 and refresh its registration with the secondary controller 140.

In the active-standby configuration, if the endpoint receives an inbound call from its primary controller 140 while it is operating in a failover mode (i.e., under the assumption that the state of its primary controller 140 is out of service and is using the secondary controller 140 as the active controller), then the call may be rejected.

During a failure condition or any other time when the endpoint believes a system 100 component is out of service, the endpoint will not try to establish a real-time communications session with the primary controller 140. Additionally, the endpoint will failover to the second or next controller 140 on the ordered list of controllers 128. Call signaling routed via the survivable (i.e., secondary, tertiary, or backup) controller 140 will allow a user of the endpoint to make and receive new calls during the time of failure.

As part of the failover/failback process, which will be described in further detail below, the endpoint will identify the address for the active controller 140 and further derive the attributes and associated features supported by the controller 140. In other words, the endpoint may be adapted to derive whether the controller 140 with which it is registered is designated as "extended/proprietary" or "basic SIP", for example. The discovery module 116 of the endpoint may be adapted to discover whether a controller uses extended or basic SIP using the following logic:

(1) Upon failover or failback the endpoint will refresh or renew its registration with each controller 140;
(2) As part of that process, the endpoint will try to re-subscribe to all primary controller 140 feature packages with the secondary controller 140;
(3) When the endpoint sends a SUBSCRIBE request to the secondary controller 140, the secondary controller will not recognize the feature subscription request if it only supports basic SIP operations; and then
(4) The simple secondary controller 140 will respond with Client Error 405 Method Not Allowed.

The endpoint may use this information to identify the secondary controller 140 as a standard IETF SIP compliant controller 140. The endpoint will then display only basic SIP features on its User Interface (UI) while operating in failover mode. If the active controller 140 is designated as "extended" (e.g., because it properly responded to the SUBSCRIBE request), then the endpoint will use SIP with the extended extensions for call and feature processing and display a compatible UI.

Additional features that may be provided in an active-standby configuration include, without limitation:

(1) The endpoint will never route outbound calls to the inactive controller 140;
(2) When the endpoint failsover from the active controller 140 to the standby controller 140, the previously active controller 140 will be designated as inactive and the previously inactive controller will be designated as active;
(3) The endpoint will wait until all active calls have completed before failing over to the designated controller 140. In other words, no new inbound calls will be accepted by the endpoint from the newly designated active controller 140 until the active call(s) has completed (i.e., until the endpoint either receives a BYE message from the network 104 for the active call(s) or the caller has hung up). Similarly, no new outbound calls will be allowed until failover is complete; and
(4) If the endpoint receives any signaling message from the primary, but out of service, controller 140 while it is using the secondary controller 140 controller, then the signaling messages from the primary controller 140 marked as out of service will be ignored. There may be one exception to this rule, however. Namely, if the endpoint receives a NOTIFY message from its primary controller 140 telling it to re-register, then the endpoint will initiate either a refresh or attempt to refresh its registration. In this case the endpoint will respond to the NOTIFY using the standard SIP processing described above.

After the endpoint has registered with its respective controller(s) 140, the method ends (step 224).

Figure 3:
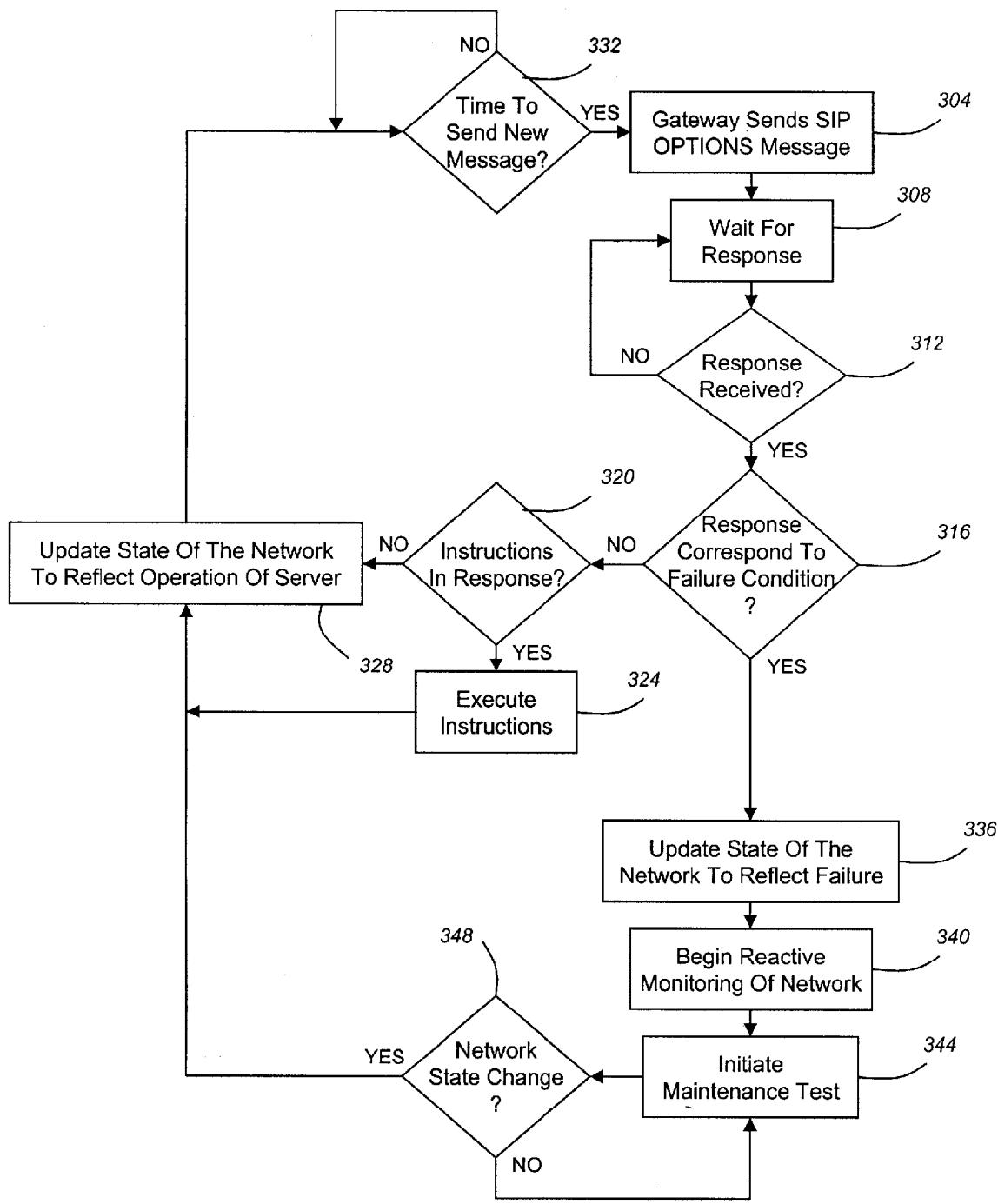
FIG. 3 is a flow diagram depicting an illustrative status determination method.

Referring now to FIG. 3, a communication system 100 status determination method will be described in accordance with at least some embodiments of the present invention. In a survivable configuration it may be important for the gateways 148 to be equipped to detect when to route call signaling via a primary or secondary signaling path. The method is initiated when the gateway 148 sends a SIP OPTIONS message to another component in the communication system 100 (step 304). Such components may correspond to SIP enabled components. The component may further correspond to peer components (i.e., components adjacent to the gateway 148) and/or far end components (i.e., components that have at least one intermediate component between them and the gateway 148). The proactive monitoring of SIP far end components should be done sparingly, usually only if a system 100 administrator knows that the intermediate components are not capable of monitoring their peers. The gateway 148 may send the SIP OPTIONS message with a setting of Max-Forwards=0, thereby ensuring that the OPTIONS message does not traverse more than a single hop (i.e., it is targeted toward a peer component).

As can be appreciated by one skilled in the art, although monitoring techniques employing a SIP OPTIONS message are described herein, any other type of non-dialog SIP transaction may be used to monitor the state of the communication system 100 and the components therein. More specifically, a generic SIP message (e.g., an INFO METHOD, MESSAGE METHOD, or even a void SIP message) may be transmitted to invoke any type of SIP-based response. The SIP message transmitted by the gateway 148 may also include instructions to be executed by the message recipient. For instance, a SIP message may be generated comprising an eXtensible Markup Language (XML) message reporting the health of the gateway 148 and any other component monitored by the gateway 148, such as peer components, as well as actions to be taken by the recipient based on the reported health of the gateway 148.

After the gateway 148 sends out the SIP OPTIONS message, it awaits receipt of a response (steps 308 and 312). The amount of time that the gateway 148 waits for receipt of the response may vary depending upon system 100 characteristics. In accordance with at least one embodiment of the present invention, the length of time that the gateway 148 waits may be determined by implementing a SIP Timer function such as SIP Timer B or SIP Timer F (SIP Timer B and F are standard SIP timers defined in RFC 3261) that cancels SIP signaling transactions (such as a SIP INVITE message) if no SIP response is received within a predetermined number of seconds after the request was sent. Timer B or Timer F is canceled or short-circuited if any SIP response (even a 100 Trying) is received. If, however, Timer B fires, the gateway 148 may be required to cancel the offending SIP transaction and attempt to route the request using an alternative route. If all routing addresses known by the gateway 148 have been exhausted, then the SIP gateway 148 may respond to the original SIP signaling transaction with a 408 Request Timeout.

Once a response is received (e.g., either as an actual response or as a determination that no response was received within a predetermined amount of time), the method continues with the gateway 148 employing the discovery module 144 to determine whether the response corresponds to a failure condition (step 316). The response may indicate that a network 104 or system 100 component has failed if any of the following conditions are met:

(1) The OPTIONS monitoring request fails due to timeout;
(2) A predetermined number (e.g., five) of consecutive SIP request transaction failures occur due to transaction timeouts and/or SIP Timer B timeouts (for INVITE transactions); or
(3) Any 400 or 500 class responses are received with a Retry-After header to an OPTIONS monitoring request if and only if the monitoring is being performed hop-by-hop (i.e., Max-Forwards=1) and not end-to-end (i.e., Max-Forwards >1), plus the address is marked "overloaded" for at least the duration specified in the Retry-After header.

With respect to condition (3), existing dialogs that include the IP address of the address should continue to use that address unless a failure occurs, but the endpoint should not use that address for new dialogs until it has recovered. In cases where an existing dialog is using a hostname instead of an IP address, the resolution of that hostname for each transaction will occur and the returned address would be the highest priority address that is available. If the hostname only resolves to a single IP address, and that address is marked as "overloaded," then the request should be sent. The net effect of condition (3) is that the discovery module 144 of the gateway 148 should be aware of three states: available; out of service; and overloaded. Addresses that are marked as overloaded continue to receive subsequent requests within a dialog, but no new dialog requests.

If, based on the response to the OPTIONS message, the discovery module 144 of the gateway 148 determines that there is no failure condition and the system 100 is in a normal state of operation, then the discovery module 144 will continue by determining whether instructions are included in the response (step 320). The discovery module 144 may analyze the response for executable instructions that are included in the response or appended to the response (i.e., in a header or footer of the message). If instructions are included in the response, then the instructions are executed (step 324). Thereafter, or in the event that the response did not include instructions, the discovery module 144 continues updating its records for the state of the system 100 to reflect the operation of the responding component, such as a server 136 (step 328). Once the state of the network has been updated, the method continues with the discovery module 144 determining whether it is time to send a new message (step 332). More particularly, the gateway 148 may use the periodic transmission of SIP OPTIONS messages to other SIP servers 136 as a heartbeat mechanism to determine if the other SIP servers 136 are active or not. The OPTIONS message may be sent to the other system 100 components at a predetermined interval. The length of the predetermined interval may be determined by implementing a SIP Timer B or a variant thereof. More specifically, the OPTIONS monitoring can be done at different intervals depending upon whether the gateway 148 detects a failure condition or not.

Illustratively, the proactive monitoring interval for the SIP OPTIONS message may be configurable within a range of about 60 to about 100,000 seconds and should use a uniform random time between 75% and 125% of the configured value between subsequent monitoring attempts. For instance, if the proactive monitoring interval is set to 60 seconds, then the actual interval between transmission of OPTIONS messages can be uniformly distributed between 45 and 75 seconds. This deliberate introduction of jitter in the proactive monitoring process allows the requests to remain unsynchronized, thereby evenly spreading the load on the monitored components (i.e., servers 136) over time. In one embodiment, the proactive monitoring interval may be configured to be about 900 seconds or 15 minutes.

Illustratively, the reactive monitoring interval for the SIP OPTIONS message may be configurable within a range of about 10 to about 3,600 seconds and may also have a uniform random time between 75% and 125% of the configured value between subsequent monitoring attempts. The provision of a separate timer for the reactive monitoring (as opposed to the proactive monitoring) allows the gateway 148 to more quickly detect when the currently out of service component being monitored becomes available again. In one embodiment, the reactive monitoring interval may be configured to be about 120 seconds.

Although described above in connection with the use of SIP Timer B, any range of values, with or without a uniform random time modification of that value, may be implemented without departing from the principles of the present invention. Additionally, the monitoring intervals may be modified based on external business logic hooks. For example, if the monitoring mechanism is hooked into a bandwidth management system, the monitoring system may further adjust the monitoring interval by some coefficient that represents the available bandwidth in the network.

Referring back to step 316, if the discovery module 144 determines that the response corresponds to a failure condition, then the discovery module 144 will update its records of the state of the system 100 to reflect the failure (step 336). As a result of detecting this component failure, the gateway 148 will failover and begin operating in a failover state, especially if the failed component resides on a primary communication path.

During failover, the discovery module 144 of the gateway 148 will begin reactively monitoring the components in the system 100 by continuing to send the OPTIONS message to the component identified as out of service (step 340). This reactive monitoring allows the discovery module 144 of the gateway 148 to detect when the component comes back online. When reactive monitoring begins, the gateway 148 will stop proactively monitoring the component and begin applying reactive monitoring rules. More specifically, during reactive monitoring, the discovery module 144 of the gateway 148 may initiate a maintenance test to determine whether or not the monitored component is available or out of service (step 344). The maintenance test may employ a monitoring algorithm similar to the proactive monitoring algorithm. The discovery module 144 of the gateway 148 will continue to apply this maintenance test until failback (i.e., until the status of the component changes from out of service to available) (step 348). During the maintenance test, the gateway 148 may transmit any type of SIP request (e.g., INVITE, SUBSCRIBE, NOTIFY, etc.) to the component currently marked as out of service. If one or more of the following conditions apply, then the discovery module 144 of the gateway 148 will continue to mark the component as out of service:

(1) SIP Timer B fires after an INVITE message has been transmitted;
(2) The gateway 148 receives a 408 Request Timeout response;
(3) The SIP request transaction times out; or
(4) A network 104 or transport layer error occurs while attempting to send the request.

If none of the above-listed conditions applies during the maintenance test, then the discovery module 144 of the gateway 148 will determine that failback has occurred and the method will continue to step 328. In accordance with at least some embodiments of the present invention, the reactive monitoring and maintenance tests will continue to be applied until the component being monitored replies with any SIP response except 503 Service Unavailable to two consecutive OPTIONS request attempts. Once these conditions have been met, the gateway 148 may consider the component back in service, may revert to the proactive monitoring algorithm, can generate an appropriate Simple Network Management Protocol (SNMP) event, and, if applicable, begin utilizing the now active component.

As can be appreciated by one skilled in the art, the gateway 148 is not the only system 100 component that may maintain path reallocation information. Rather, any SIP network element may be adapted to include path reallocation information and the like. For example, an endpoint such as the UA 108 may also maintain a path reallocation table that lists the communication paths that may be used if certain components are identified as out of service.

Figure 4:
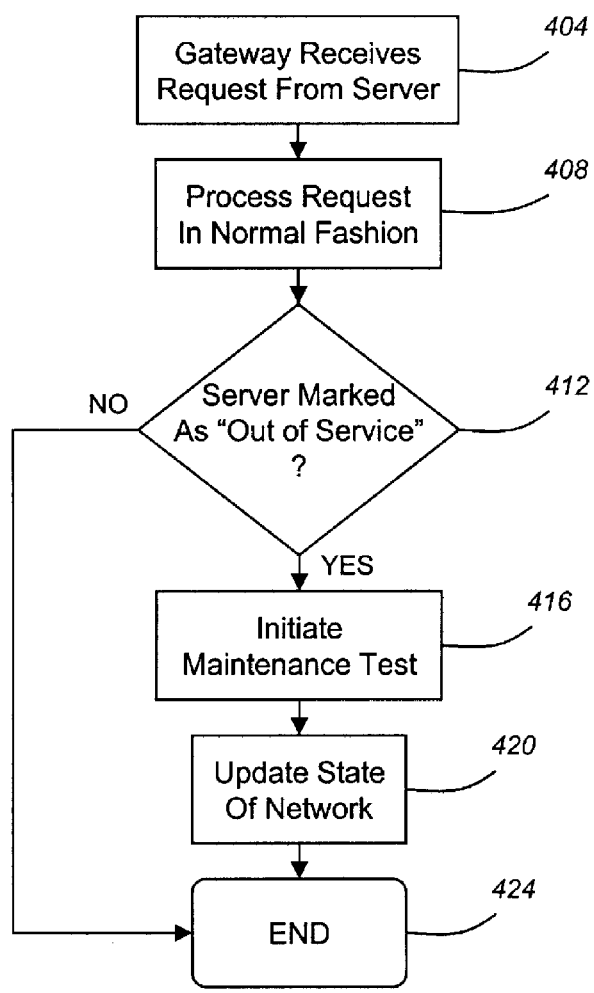
FIG. 4 is a flow diagram depicting an illustrative reactive status determination method.

Referring now to FIG. 4, a reactive monitoring method will be described. The method begins when the gateway 148 receives a request from a server 136 or similar system 100 component (step 404). The gateway 148 handles the received request in the normal fashion (step 408). More specifically, the gateway 148 may process the request as if the sending component were in service, without first determining whether the component is actually in service.

Thereafter, the gateway 148 determines whether the sending component is actually marked as out of service based on its internally maintained state tables (step 412). If the component is not marked as being out of service, then the method ends (step 424). Otherwise, the gateway 148 will initiate its maintenance test by sending SIP OPTIONS messages to the component (step 416). The gateway 148 may then update its records of the state of the component (step 420). This maintenance testing and state updating process is repeated until the component is determined to be back in service, at which point the method ends (step 424).

Figure 5:
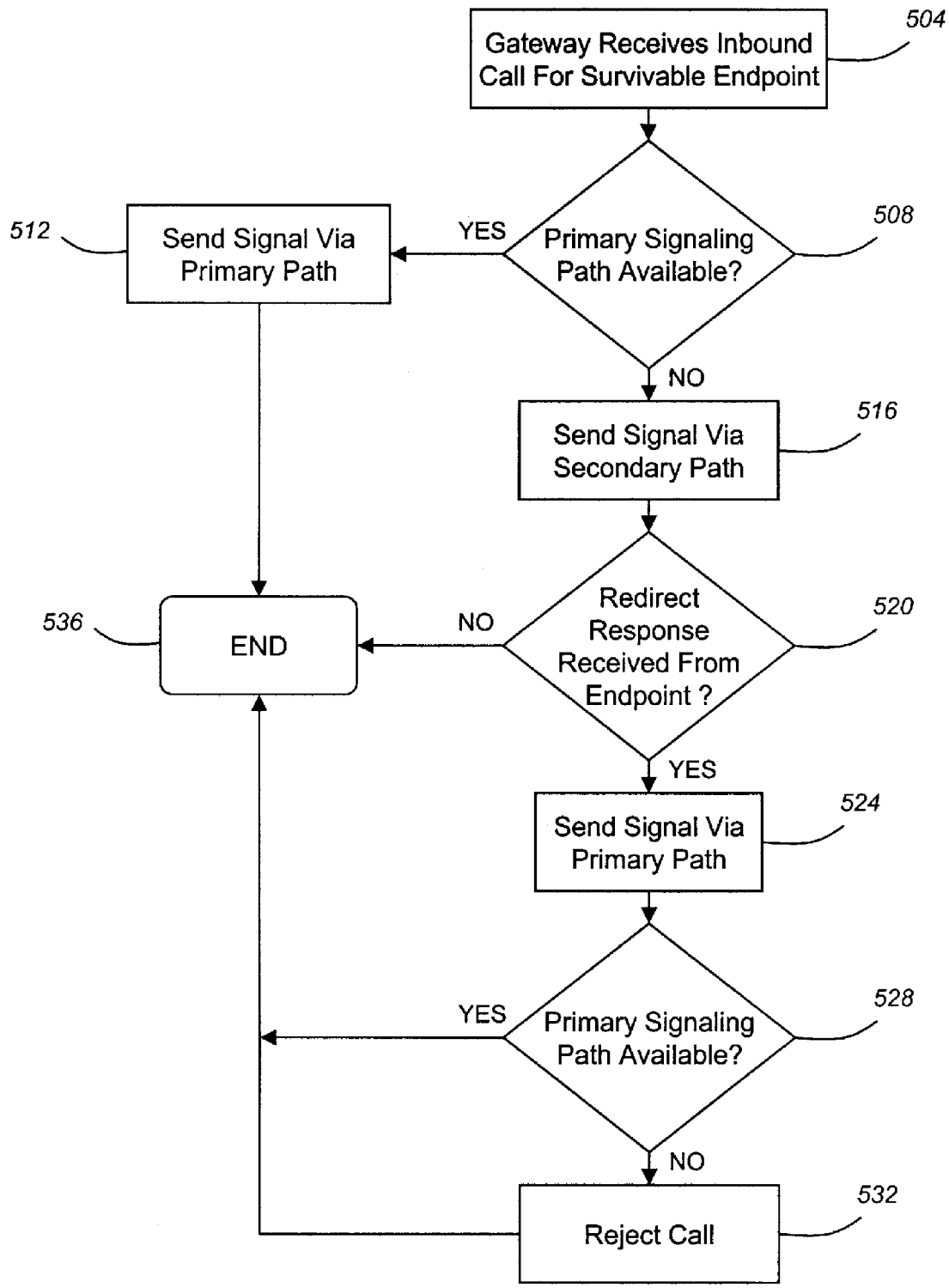
FIG. 5 is a flow diagram depicting an illustrative gateway operation method.

With reference to FIG. 5, the operation of the gateway 148 during the failover and failback states will be described. In this particular method, the controller 140 associated with the gateway 148 may correspond to a secondary or backup controller 140 for a survivable endpoint. The method is initiated when the gateway 148 receives an inbound call for a survivable endpoint (step 504). The gateway 148 then determines whether the primary signaling path is available for use (step 508). In accordance with at least some embodiments of the present invention, the gateway 148 may reference its internal component state tables during this step.

If the primary signaling path is determined to be operational, then the gateway 148 routes the received signal to the target endpoint via the primary path (step 512) after which the method ends (step 536). If, however, the gateway 148 determines that the primary signaling path is unavailable for any reason (e.g., a network 104, server 136, or other component on the primary signaling path is out of service), then the method continues with the gateway 148 sending the signal to the target endpoint via the secondary signaling path (step 516). This particular step is performed based on the assumption that the secondary signaling path is not also unavailable. If the gateway determines that the secondary signaling path is also unavailable, then another backup signaling path that bypasses the failed component(s) is selected and used to send the signal to the endpoint.

After the call signal has been transmitted to the target endpoint via the secondary signaling path, the gateway 148 waits to determine whether a 305 redirect response (use proxy) message is received from the endpoint (step 520). In an active-standby configuration, the endpoint receiving the call signal via the second path may transmit a 305 redirect response if the endpoint believes the primary signaling path to be operational. This belief would be based on status monitoring operations performed at the endpoint rather than at the gateway 148. Thus, based on the different perspective of the system 100, the endpoint may have a different status marked for one or more components in the system 100. Accordingly, if a 305 redirect response is received by the gateway 148 based on its redirection of the call signal via the secondary path, then the gateway 148 will attempt to redirect the call signal via the primary signaling path (step 524). If the primary signaling path is determined to be available (step 528) due to the successful transmission of the call signal, then the method ends in step 536. If the call is rejected due to the unavailability of the primary signaling path, then the call may be rejected or sent back via the secondary signaling path (step 532). Additionally, the gateway 148 may send a NOTIFY message to the target endpoint instructing it to re-check its view of the state of the primary signaling path. Thereafter, or if no redirect response message is received from the endpoint, the method ends (step 536).

Figure 6:
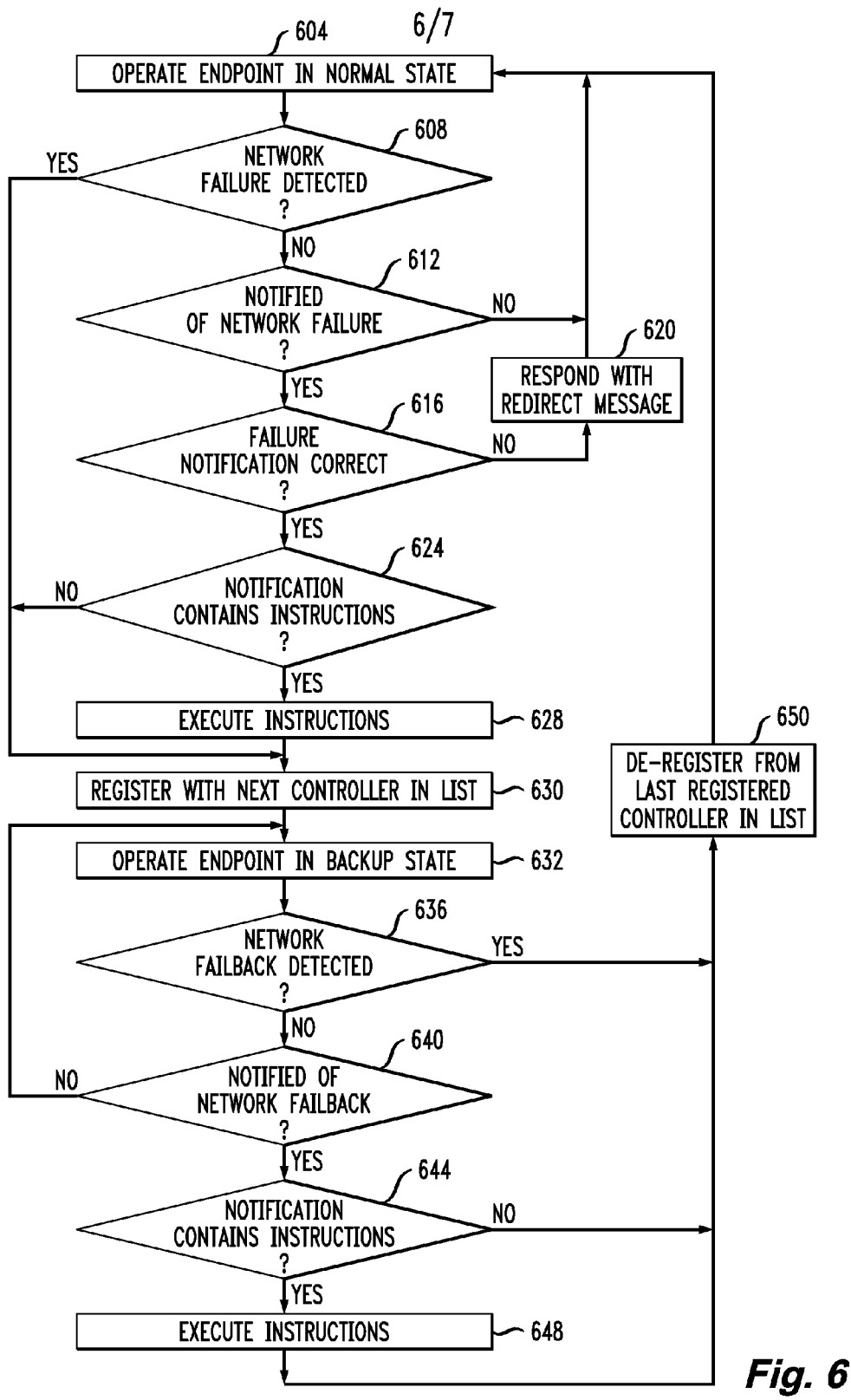
FIG. 6 is a flow diagram depicting an illustrative status determination method for an endpoint.

Referring now to FIG. 6, an endpoint method of system 100 status determination will be described in accordance with at least some embodiments of the present invention. Initially, the endpoint (e.g., the survivable UA 108) operates in a normal state (step 604). The endpoint then employs the logic of its discovery module 116 to determine if a network failure has been detected (step 608). In a survivable configuration, it is useful for the endpoints to be able to detect when to failover or failback. The discovery module 116 logic used by the endpoint will determine that a network failure has occurred if one or more of the following events occur:

(1) The endpoint does not receive a response to a SIP REGISTER message as a heartbeat from all controllers 140 with which it is trying to register (e.g., its primary and secondary controllers 140);

(2) The endpoint does not receive a response to a SIP INVITE message, where the SIP INVITE message may have been transmitted in the normal process of trying to setup an outbound call;

(3) The endpoint does not receive a response to any SIP signaling message sent for normal creation of a new SIP dialog or mid-dialog changes; or (4) The endpoint does not receive a successful response to a critical request (which can be carried by different types of protocols such as TCP/IP, HTTP, XML, or SOAP) from its configuration server(s), or any other out of band non-communication service such as data services used to retrieve data related to the failure.

If the endpoint does not detect a failure itself, then the method continues with the endpoint determining whether it has been notified of a failure (step 612). Notification may be received at the endpoint in the form of a SIP NOTIFY message transmitted from the gateway 148, server 136, or some other component in the system 100 that is capable of monitoring the state of the system 100. The SIP NOTIFY message may indicate that the endpoint should failover, reboot, or refresh/renew its registration with all of its controllers 140 (thereby circumventing the logic of the endpoint). If no notification is received, then the method returns back to step 604.

If, however, the endpoint is notified of a failure in the system 100 (e.g., via receipt of a SIP NOTIFY message), then the endpoint determines whether the failure notification is correct (step 616). More specifically, the endpoint may check its internally maintained list of controllers 120, 128 to determine whether any of the controllers 140 is marked as inactive or otherwise out of service. Most times the endpoint will simply comply with the directions of the NOTIFY message. Under certain circumstances, however, the endpoint may determine that its view of the system 100 is the correct view and may respond to the NOTIFY message with a redirect response message (step 620). This redirect response may cause the initiating component of the NOTIFY message to check its view of the system 100. The method then returns to step 604.

If the endpoint decides that the failure notification is correct or decides to comply with the directions of the NOTIFY message, then the endpoint determines whether the NOTIFY message contained instructions (step 624). The instructions may be relatively general instructions such as attempt to re-register with all controllers 140. Alternatively, the instructions may comprise an instruction set requiring the endpoint to try and re-register with a specific controller 140. The endpoint may attempt to refresh or register with the controller 140 on either long or short intervals. The length of the refresh/register interval may vary depending upon the instructions in the instruction set or other factors. The instructions may also contain health information for the entire system 100 as perceived by the component that transmitted the NOTIFY message. If the message does contain instructions, then the endpoint will execute the instructions (step 628).

If the endpoint itself detects a failure (step 608), or after the instructions have been executed by the endpoint (step 628) or in the event that the message does not contain instructions, (step 624), the endpoint registers with the next controller 140, if any, in the ordered list 128 in order to maintain the number of operational controllers 140 that it is registered with at N (step 630). The registration is effected in the same manner as described above for step 220 of FIG. 2. The method then continues with the endpoint executing a failover such that it begins operating in a backup state (step 632). During operation in the failover mode, the endpoint will utilize its backup controller 140 and/or utilize a secondary signaling path. In addition to operating in the failover mode, the endpoint may monitor for system 100 failback (step 636). The endpoint will determine that failback has occurred if the discovery module 116 detects that its primary controller 140 is available to resume its role as the active controller. This internal endpoint logic may be governed by the heartbeat/SIP REGISTER message that is periodically sent to all controllers 140 with which the endpoint is registered, independent of whether or not the controller 140 is active at any given time.

If the endpoint does not detect failback on its own (step 636), the method continues with the endpoint determining whether it has been notified of failback by another component (e.g., by receiving a NOTIFY message from the gateway 148, the server 136, etc.) (step 640). If the endpoint is not notified of failback, then the method returns to step 632. If, however, the endpoint does receive a NOTIFY message indicating failback, then the method continues by determining whether the NOTIFY message contained instructions for execution by the endpoint (step 644). If instructions were included in the NOTIFY message, then the instructions are executed by the endpoint (step 648). After execution of the instructions (step 648), if there were no instructions (step 644), or if failback was detected by the endpoint itself (step 636), the endpoint deregisters from the controller 140 that it last registered with at step 634 in order to maintain the number of operational controllers 140 that it is registered with at N (step 650). The act of removing a registration triggers both a SIP un-register and network detachment algorithms that include unsubscribing to SIP event packages and possibly other non-SIP (e.g., out-of-band) data interactions. The method then returns to step 604.

The discovery module 116 may comprise a configurable parameter governing whether the failover or failback from primary to secondary controllers 140 is to be triggered by the automated endpoint detection or if it is only to be triggered manually (i.e., by receipt of a SIP NOTIFY message). The heartbeat monitoring mechanism employed by the discovery module 116 may be done at different intervals depending on whether the endpoint detects a failure condition or not.

Figure 7:
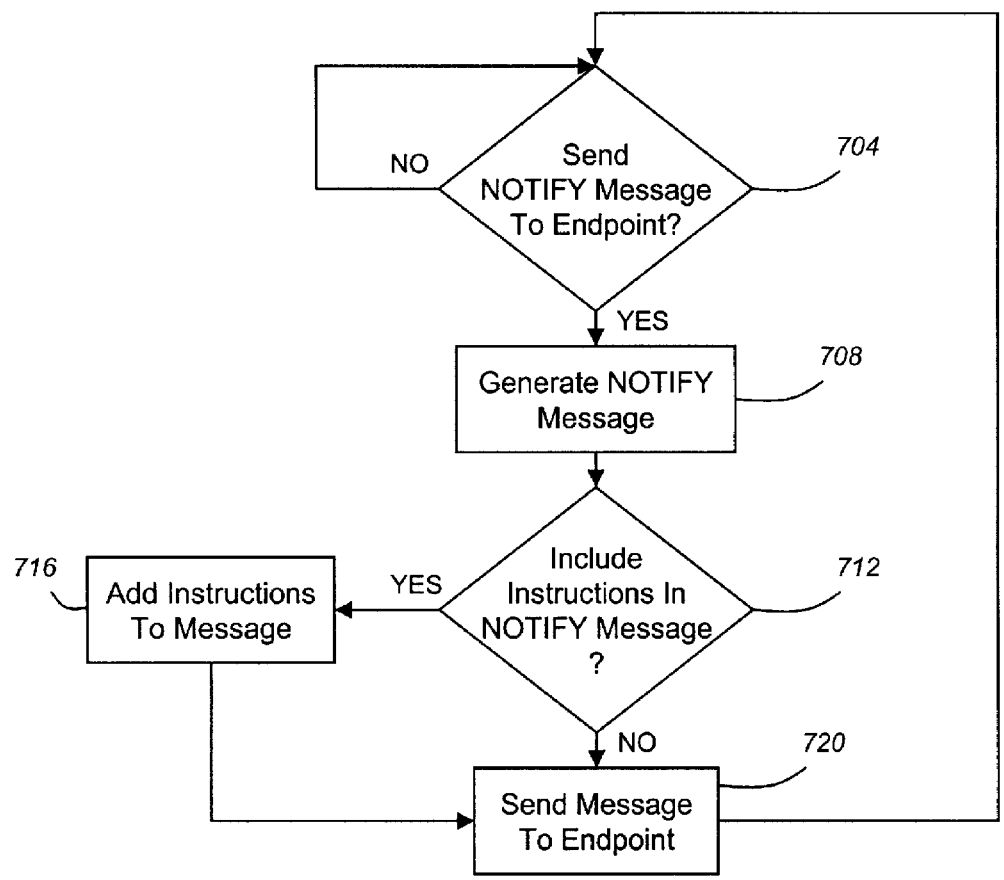
FIG. 7 is a flow diagram depicting an illustrative status notification method.

With reference now to FIG. 7, a status notification method will be described. The method begins with a system 100 component (e.g., the server 136, gateway 148, or any other device comprising a discovery module 144) determining whether it should notify an endpoint, such as the UA 108, with regards to the system 100 (step 704). Typically, the component will send a NOTIFY message to an endpoint, notifying the endpoint that some aspect of the system 100 state has changed. For instance, the NOTIFY message may inform the endpoint that a component in the system has been registered as out of service. Alternatively, the NOTIFY message may inform the endpoint of the sending component's health.

The method remains in step 704 until it is determined that a notification message should be transmitted to an endpoint. After making such a determination, the method continues with the component generating the message (e.g., a NOTIFY message) (step 708). As can be appreciated, however, any other type of SIP or non-SIP message may be employed by the component to notify the endpoint. The notification may allow the component to trigger the endpoint to failover or failback in a system 100 failure or recovery condition. Since the endpoint may maintain an ordered list of controllers 128 and the endpoint has the ability to maintain active registrations with all of these controllers, the system 100 component can trigger the endpoint to take action when it detects a system 100 failure condition. The actions may be triggered by either transmitting a standard notification message (e.g., a standard SIP IETF compliant NOTIFY message) or an extended message containing a specific instruction set, for example. Accordingly, the method continues with the component determining whether the notification message should include instructions therein (step 712).

If no specific instructions are determined to be necessary, then the component can tell the endpoint to re-register with N of the controllers 140 in the ordered list of controllers 128 and send a generic notification message to the endpoint (step 720). Thus, any endpoint that receives such a notification will try to re-register with the N controllers 140 on its list. Based on the success of this attempted re-registration, the endpoint will be able to derive which controllers 140 are available for processing SIP transactions (e.g., supporting inbound and outbound SIP calls). The endpoint may then behave in accordance with this self-determined information using the highest priority controller 140 on the ordered list of controllers 128 as its primary controller. This particular mechanism may use standard SIP IETF compliant NOTIFY messages. The message may follow the SIP standard for NOTIFY message with the NOTIFY parameter "event"="probation." An example of such a NOTIFY message is provided below:

```
<registration aor="sip:joe@example.com" id="a7" state="active">
  <contact id="76" state="active" event="probation"
    expires="0"
    q="0.8" retry-after="0">
```

If, however, the component determines that specific instructions should be included in the notification message, then the component may add one or more instruction sets to the message (step 716) prior to sending the message to the endpoint (step 720). By incorporating instructions in the notification message, the component can tell the endpoint to begin using a specific controller 140 on the endpoint's controller 140 list 120. In such a scenario, the endpoint depends on the component to tell it which controller 140 should be used, rather than relying on its own intelligence. This particular mechanism may use the standard SIP NOTIFY message with an extended extension. The NOTIFY message will generally follow the SIP standard for NOTIFY messages; additionally, it may use an exemplary profile event package format with the event name such as <eventName>changeServer</eventName>if the endpoint should failover or failback. The message may also include a timestamp and the address of the server 136 containing the particular controller 140 to which the endpoint should failover of failback. An example of such an extended SIP NOTIFY message is provided below with an XML instruction set:

```
NOTIFY sip:1111@10.0.75.2 SIP/2.0
Call-ID: cid-1@10.0.75.2
CSeq: 2 NOTIFY
From: <sip:1111@atler.com>; tag=random2
To: <sip: 1111@atler.com>; tag=random1
Via: SIP/2.0/UDP 10.0.0.100;branch-id=z9hG4bk-random-the primary call
    controller
SIP/2.0/TLS 10.0.0.200;branch-id=z9hG4bK-random-cm1
Content-Length: 22
Content-Type: application/profile+xml
Contact: <sip:1111@10.0.0.200;transport=tls/
Max-Forwards: 69
User-Agent: Communication Manager v1.0
Event: ccs-profile
Subscription-State: active;expires=3600
Record-Route: <sip:10.0.0.100:5060;lr;transport=UDP>
<?xml version="1.0">
<event>
<eventName>changeServer</eventName>
<eventTime>{time stamp}</eventTime>
<eventData>{ip address}</eventData>
</event>
```

As can be appreciated by one skilled in the art, the instructions may take many different forms other than an XML instruction set. For example, the instructions may comprise a predetermined trigger that corresponds to and causes execution of an algorithm or application already stored in memory 112 of the endpoint. Additionally, although the example NOTIFY message above included its instruction set in the body of the message, the instruction set may also be placed in the header or trailer of a notification message. This may vary depending upon the type of notification message employed. The instructions may be used to accomplish a number of different actions such as convey health information for the sending component as well as its state information for the rest of the system 100 as well as trigger the endpoint to perform a particular task.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using procedural or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for maintaining a SIP survivable network and network components. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
a client creating a list of a plurality of servers;
the client determining a first sub-plurality of servers with which to register, wherein the first sub-plurality of servers comprises more than one but fewer than all servers of the plurality of servers;
the client registering with the first sub-plurality of a plurality of servers;
the client obtaining services from at least one server of the first sub-plurality of servers;
in response to a first server of the first sub-plurality becoming unavailable to the client, the client determining a second sub-plurality of the plurality of servers with which to register;
the client registering with the second sub-plurality of servers, wherein at least a second server is currently included in the first sub-plurality of servers, thereby adding the second server to the second sub-plurality of servers, wherein the client is in an active-standby configuration;
the client, receiving an inbound call from the second server;
in response to the client receiving the inbound call from the second server:
the client responding to the second server with a SIP TRYING message; and
sending a SIP REGISTRATION refresh to the first server; and
in response to the first server being online, sending a SIP REDIRECT message to the second server.

2. The method of claim 1 further comprising:
in response to the unavailable first server becoming available again to the client, the client de-registering with the second server, thereby removing the second server from the second sub-plurality of servers.

3. The method of claim 2 further comprising:
in response to the unavailable first server becoming available again to the client, the client re-registering with the first server, thereby adding the first server back to the second sub-plurality of servers.

4. The method of claim 2, further comprising:
in response to the first server becoming unavailable or the first server becoming available again, sending a SIP SUBSCRIBE message to the second server, wherein the SIP SUBSCRIBE message contains extended SIP extensions;
receiving a Client Error Method Not Allowed message from the second server; and
in response to receiving the Client Error Method Not Allowed message, only displaying basic SIP features in a user interface.

5. The method of claim 1 wherein:
the servers of the plurality of servers are
ordered in a sequence;
registering with the first sub-plurality of a plurality of servers comprises:
the client registering with the first N servers of the sequence that are available to the client, wherein N is an integer; and
registering with a second server comprises
the client registering with the (N+1) st server of the sequence that is available to the client.

6. The method of claim 1, wherein the first server of the plurality of servers becomes unavailable based on the client receiving a SIP 400 or 500 class response with a Retry-After header that is sent in response to a SIP OPTIONS monitoring request, and wherein the monitoring is being performed on a hop-by-hop basis.

7. A non-transitory computer readable storage medium storing instructions which, when executed by a computer, cause the computer to perform the method of one of claims 1-5.

8. An apparatus comprising:
a plurality of servers, each server including at least one controller, wherein at least one server includes a processor and memory; and
a client adapted to register with a first sub-plurality of the plurality of servers, wherein the first sub-plurality comprises more than one but fewer than all servers of the plurality of servers, to obtain services from at least one server of the first sub-plurality of servers, the client being adapted to:
determine that at least one server of the first sub-plurality is not available;

in response to the at least one server of the first sub-plurality becoming unavailable, determine a second sub-plurality of servers with which to reregister;

reregister with the second sub-plurality of the plurality of servers, wherein the second sub-plurality of servers includes at least a first server of the plurality of servers that is not currently included in the first sub-plurality of servers, wherein the first server of the plurality of servers becomes unavailable based on the client receiving a SIP 400 or 500 class response with a Retry-After header that is sent in response to a SIP OPTIONS monitoring request, and wherein monitoring, in response to the SIP OPTIONS monitoring request, is being performed on a hop-by-hop basis.

9. The apparatus of claim 8 wherein:

the client is further adapted to de-register with the first server and thereby remove the first server from the second sub-plurality of servers in response to an unavailable second server becoming available again to the client.

10. The apparatus of claim 9 wherein:

the client is further adapted to re-register with the second server to add back the second server to the second sub-plurality of servers in response to the unavailable second server becoming available again to the client.

11. The apparatus of claim 8 wherein:

the servers of the plurality of servers are ordered in a sequence;

the first sub-plurality of the servers contains the first N servers of the sequence that are available to the client, where N is an integer; and the first server is the (N+1)st server of the sequence that is available to the client.

12. The apparatus of claim 8, wherein at least a second server is currently included in the first sub-plurality, thereby adding the second server to the second sub-plurality of servers, wherein the client is in an active-standby configuration, and wherein the client is further adopted to:

receiving an inbound call from the second server;

in response to the client receiving the inbound call from the second server:

respond to the second server with a SIP TRYING message; and send a SIP REGISTRATION refresh to the first server; and send a SIP REDIRECT message to the second server in response to the first server being online.

13. A non-transitory computer readable medium including instructions executable on a computer system for conducting a method, the instructions comprising:

instructions to receive, from a client, a first client registration with a first sub-plurality of a plurality of servers, wherein the first sub-plurality comprises more than one but fewer than all servers of the plurality of servers;

instructions to provide a client with services from at least one server of the first sub-plurality of servers;

in response to a first server of the first sub-plurality becoming unavailable to the client, instructions to receive a second client registration with a second server of the plurality that is not currently included in the first sub-plurality; and in response to receiving the second registration, instructions to add the second server to the first sub-plurality of servers, wherein the registration of the second server creates a new second sub-plurality of servers, wherein the client is in an active-standby configuration;

the client, having instructions to receive an inbound call from the second server;

in response to the client receiving the inbound call from the second server:

the client having instructions to respond to the second server with a SIP TRYING message; and instructions to send a SIP REGISTRATION refresh to the first server; and in response to the first server being online, instructions to send a SIP REDIRECT message to the second server.

14. The computer readable medium of claim 13, further comprising:

in response to the unavailable first server becoming available again to the client, instructions to receive a de-registration, from the client, that de-registers with the second server, thereby removing the second server from the first sub-plurality of servers, wherein the deregistration of the second server creates a third sub-plurality of servers.

15. The computer readable medium of claim 14 further comprising:

in response to the unavailable first server becoming available again to the client, instructions to receive a re-registration, from the client, with the first server, thereby adding the first server to the third sub-plurality of servers to reform the first sub-plurality of servers.

16. The computer readable medium of claim 13 wherein the servers of the plurality of servers are ordered in a sequence;

registering with the first sub-plurality of a plurality of servers comprises:

instructions to receive a registration, from the client, registering with the first N servers of the sequence that are available to the client, wherein N is an integer; and instructions to receive a registration, from the client, registering with a second server comprises instructions to receive a registration, from the client, registering with the (N+1)st server of the sequence that is available to the client.

* * * * *

UNITED STATES PATENT AND TRADEMARK OFFICE
CERTIFICATE OF CORRECTION

| | | |
|---|---|---|
| PATENT NO. | : 8,527,656 B2 | Page 1 of 1 |
| APPLICATION NO. | : 12/211284 | |
| DATED | : September 3, 2013 | |
| INVENTOR(S) | : Al Baker et al. | |

It is certified that error appears in the above-identified patent and that said Letters Patent is hereby corrected as shown below:

In the Claims:

Column 22, line 54, please delete "5" and insert --4--.

Signed and Sealed this
Fourth Day of March, 2014

Michelle K. Lee
*Deputy Director of the United States Patent and Trademark Office*